(12) United States Patent
Stoppe

(10) Patent No.: US 11,830,171 B2
(45) Date of Patent: Nov. 28, 2023

(54) REDUCING IMAGE ARTIFACTS IN IMAGES

(71) Applicant: Carl Zeiss Microscopy GmbH, Jena (DE)

(72) Inventor: Lars Stoppe, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 285 days.

(21) Appl. No.: 16/761,541

(22) PCT Filed: Nov. 6, 2018

(86) PCT No.: PCT/EP2018/080231
§ 371 (c)(1),
(2) Date: May 5, 2020

(87) PCT Pub. No.: WO2019/086686
PCT Pub. Date: May 9, 2019

(65) Prior Publication Data
US 2020/0265570 A1    Aug. 20, 2020

(30) Foreign Application Priority Data
Nov. 6, 2017  (DE) .......................... 102017125799.3

(51) Int. Cl.
*G06T 5/50* (2006.01)
*G06T 7/33* (2017.01)
(Continued)

(52) U.S. Cl.
CPC .............. *G06T 5/50* (2013.01); *G02B 21/365* (2013.01); *G06T 7/33* (2017.01); *G06V 10/141* (2022.01);
(Continued)

(58) Field of Classification Search
CPC ... G06T 5/50; G06T 7/33; G06T 2207/10056; G06T 2207/10152; G06T 2207/20216; G02B 21/365; H04N 5/2354
(Continued)

(56) References Cited

U.S. PATENT DOCUMENTS 6,061,091 A  5/2000 Van de Poel et al.
10,620,417 B2  4/2020 Stoppe et al.
(Continued)

FOREIGN PATENT DOCUMENTS

CN  1906633 A  1/2007
CN  104145276 A  11/2014
(Continued)

OTHER PUBLICATIONS

International Search Report from corresponding International Patent Application No. PCT/EP2018/080231, dated Feb. 12, 2019.
(Continued)

*Primary Examiner* — Joseph G Ustaris
*Assistant Examiner* — Jimmy S Lee
(74) *Attorney, Agent, or Firm* — KUSNER & JAFFE

(57) ABSTRACT

Images are captured with a sample object in various arrangements relative to lighting and a detector. The images are then combined image point by image point on the basis of a comparison of image point values of image points of said images. This achieves a reduction in interference, i.e. reflections and/or shadows can be reduced.

17 Claims, 8 Drawing Sheets

(51) Int. Cl.
  *G02B 21/36* (2006.01)
  *H04N 23/74* (2023.01)
  *G06V 10/141* (2022.01)
  *G06V 10/98* (2022.01)
  *G06V 10/10* (2022.01)
(52) U.S. Cl.
  CPC ............. *G06V 10/98* (2022.01); *H04N 23/74* (2023.01); *G06T 2207/10056* (2013.01); *G06T 2207/10152* (2013.01); *G06T 2207/20216* (2013.01); *G06V 10/16* (2022.01)
(58) Field of Classification Search
  USPC .......................................................... 348/79
  See application file for complete search history.

(56) References Cited

U.S. PATENT DOCUMENTS

| | | | |
|---|---|---|---|
| 2009/0070059 A1 | 3/2009 | Heiden et al. | |
| 2015/0312463 A1* | 10/2015 | Gupta | H04N 5/2355 348/239 |
| 2016/0007856 A1* | 1/2016 | Ishihara | A61B 1/043 600/476 |
| 2016/0124203 A1* | 5/2016 | Ryu | G02B 21/06 348/79 |
| 2016/0180559 A1* | 6/2016 | Karpenko | G06T 7/70 382/284 |
| 2016/0320604 A1 | 11/2016 | Stoppe et al. | |
| 2017/0168285 A1* | 6/2017 | Ozcan | G03H 1/0443 |
| 2017/0175174 A1* | 6/2017 | Chiu | C12Q 1/6816 |
| 2017/0330019 A1* | 11/2017 | Nakatsuka | G06K 9/00134 |
| 2019/0004304 A1 | 1/2019 | Gaiduk et al. | |
| 2019/0114465 A1* | 4/2019 | Shibata | C12M 41/00 |
| 2019/0155012 A1 | 5/2019 | Stoppe et al. | |

FOREIGN PATENT DOCUMENTS

| | | |
|---|---|---|
| DE | 102007042272 A1 | 3/2009 |
| DE | 102014113256 A1 | 3/2016 |
| DE | 102015208080 A1 | 11/2016 |
| DE | 102015208087 A1 | 11/2016 |
| DE | 102015122712 A1 | 6/2017 |
| DE | 102016108079 A1 | 11/2017 |
| JP | 2016063540 A | 4/2016 |
| JP | 6608658 B2 | 11/2019 |

OTHER PUBLICATIONS

Weckenmann et al., "Multisensor Data Fusion in Dimensional Metrology," CIRP Annals—Manufacturing Technology, vol. 58, Issue 2 (2009), pp. 701-721.

Office Action (and its English translation) dated Mar. 10, 2023 from related/corresponding Chinese Patent Application No. 201880071569.3.

\* cited by examiner

REDUCING IMAGE ARTIFACTS IN IMAGES

TECHNICAL FIELD

Various examples of the invention relate to image capture techniques. Various examples of the invention relate, in particular, to techniques for reducing image artifacts—such as, for example, reflections and/or shading—in images.

BACKGROUND

Image artifacts can occur during image recording by means of an optical system with illumination by an illumination module. Examples of image artifacts comprise reflections and shading. Image artifacts are often based on the interaction between illumination, sample object and detection optics of a detector of the optical system. Reflections resulting in an increased or decreased intensity in a region of a corresponding image cause a loss of information. If the light used for illuminating (illumination) is reflected into a region of the image, e.g. the information about those regions of the sample object to be imaged which are intended to be imaged into the corresponding image region is lost as a result. Reflections in recorded images thus impair the image impression. Correspondingly, the image can undermodulate as a result of shading, as a result of which the image impression is also impaired.

Reflections can have various causes. A reflection in an image can arise on account of a reflection within an optical system. By way of example, a multiple reflection of the illumination within the optical system can result in an image reflection arising. Reflections can also be referred to as system reflections. Alternatively or additionally, a high reflectivity of the sample object to be imaged in specific directions can also result in an image reflection arising. Reflections of this type can also be referred to as object reflections. By way of example, in the case of reflected-light illumination of an object, the high reflectivity of the object can result in the illumination light being reflected in an image region. Such effects can also result in shading in a corresponding manner.

There are various approaches for reducing image artifacts. The reduction of image artifacts is understood herein to mean a reduction of the loss of information on account of reflections and/or on account of shading.

In order to reduce reflections in images that are caused by reflection at optical components of the system, higher-quality optics can be used in order to produce high-quality imagings. Examples of such measures are antireflection coatings on the critical optical surfaces within the system, optical designs having increased complexity in order to reduce reflections, providing parts that are not relevant to the imaging with a matt finish, and/or a polarization-optical antireflection device. However, the use of such optics can result in cost disadvantages. Furthermore, more complex optics can also result in extensive structural space and high weight. Confocal recording techniques, for example using a confocal microscope, may use point scanners and/or line scanners. Such scanning methods can significantly increase the recording time.

DE 10 2014 113 256 A1, DE 10 2015 208 080 A1, and DE 10 2015 208 087 A1 each disclose techniques for reducing the image artifacts by means of digital postprocessing. Such techniques have certain limitations, however: it has been observed, for example, that the reduction of reflections can result in an intensification of shading. Moreover, it may often be necessary to use different illuminations which satisfy particular criteria: e.g. it may often be necessary to implement particularly adjacent illumination directions for different illuminations. That may often not be possible or be possible only in a limited way. By way of example, in some applications it may happen that the illumination direction is not known or is known only very inaccurately. The flexibility with which an illumination direction can be set may often be limited.

BRIEF DESCRIPTION OF THE INVENTION

There is therefore a need for improved techniques for imaging a sample object. In particular, there is a need for apparatuses and methods which can be used to suppress reflections and shading by the processing of captured images. There is a need for such apparatuses and methods which make it possible to achieve a good resolution and good contrast in a result image.

A method for reduction of artifacts in images comprises capturing a first image of a sample object. The first image is captured by means of an illumination of an illumination module and by means of detector elements of a detector. The first image is captured for a first arrangement of the sample object with respect to the illumination and with respect to the detector. The method also comprises capturing a second image of the sample object. The second image, too, is captured by means of the illumination of the illumination module and by means of the detector. The second image is captured for a second arrangement of the sample object with respect to the illumination and with respect to the detector. The second arrangement is at least partly different than the first arrangement. The method furthermore comprises, for each pixel of the first image: comparing the respective pixel value with at least one pixel value of at least one assigned pixel of the at least one second image. The method also comprises combining the first image and the at least one second image pixel by pixel, depending on said comparing. A result image is generated as a result.

A computer program product or a computer program comprises program code. The program code can be executed by a processor. Executing the program code has the effect that the processor carries out a method. The method comprises capturing a first image of a sample object. The first image is captured by means of an illumination of an illumination module and by means of detector elements of a detector. The first image is captured for a first arrangement of the sample object with respect to the illumination and with respect to the detector. The method also comprises capturing a second image of the sample object. The second image, too, is captured by means of the illumination of the illumination module and by means of the detector. The second image is captured for a second arrangement of the sample object with respect to the illumination and with respect to the detector. The second arrangement is at least partly different than the first arrangement. The method furthermore comprises, for each pixel of the first image: comparing the respective pixel value with at least one pixel value of at least one assigned pixel of the at least one second image. The method also comprises combining the first image and the at least one second image pixel by pixel, depending on the comparing. A result image is generated as a result.

A controller for an optical system having an illumination module and a detector having a plurality of detector elements is configured to control the optical system to capture a first image of a sample object for a first arrangement of the sample object with respect to the illumination by the illumination module and with respect to the detector. The controller is also configured to control the optical system to capture a second image of the sample object for a second arrangement of the sample object with respect to the illumination and with respect to the detector. In this case, the second arrangement is at least partly different than the first arrangement. The controller is furthermore configured, for each pixel of the first image, to compare the respective pixel value with at least one pixel value of at least one assigned pixel of the at least one second image. Finally, the controller is configured to combine the first image and the at least one second image pixel by pixel depending on said comparing. A result image is generated as a result.

Each image of the first image and of the at least one second image can be an intensity image.

The first arrangement is partly different than the second arrangement if at least one of the following criteria is satisfied: (i) different position and/or orientation of the sample object with respect to the illumination, for instance by using different illumination geometries; and/or (ii) different position and/or orientation of the sample object with respect to the detector, for instance by displacing the sample object and/or the detector.

Comparing the pixel values of pixels assigned to one another makes it possible to identify image artifacts particularly reliably. In particular, it may be possible to dispense with taking account of absolute threshold values or a priori information in order to identify the image artifacts.

It may be possible to dispense with using a shading function—e.g. as described in DE 10 2014 113 256 A1.

Reflections, e.g. object reflections and/or image reflections, can be reduced by means of the techniques described herein. Shading can also be reduced by means of the techniques described herein. In this case, the reduction of interference can be achieved by means of digital postprocessing.

By way of example, the techniques described herein can be applied to a light microscope as optical system.

The illumination can be characterized by one or more used illumination directions or illumination geometries. It is also possible to use different light colors for the illumination.

Combining pixel by pixel can mean that pixel values of first assigned pixels are combined with one another differently than pixel values of second assigned pixels. By way of example—depending on the set of assigned pixels—different weights could be used for the combination or else different pixels could be entirely discarded before the combination, with the result that they have no influence on the result image.

The features set out above and features that are described below may be used not only in the corresponding combinations explicitly set out, but also in further combinations or in isolation, without departing from the scope of protection of the present invention.

DETAILED DESCRIPTION OF EMBODIMENTS

The present invention is explained in greater detail below on the basis of preferred embodiments with reference to the drawings. In the figures, identical reference signs denote identical or similar elements. The figures are schematic illustrations of various embodiments of the invention. Elements illustrated in the figures are not necessarily illustrated as true to scale. Rather, the various elements illustrated in the figures are rendered in such a way that their function and purpose become comprehensible to the person skilled in the art.

Connections and couplings between functional units and elements as illustrated in the figures can also be implemented as an indirect connection or coupling. A connection or coupling can be implemented in a wired or wireless manner.

A description is given below of techniques which make it possible computationally to suppress image artifacts, that is to say in particular reflections and/or shading, during the imaging of a sample object. In this case, "reduction of interference" is understood to mean measures which make it possible to reduce the loss of information that is conventionally associated with the presence of reflections and/or shading.

Figure 1:
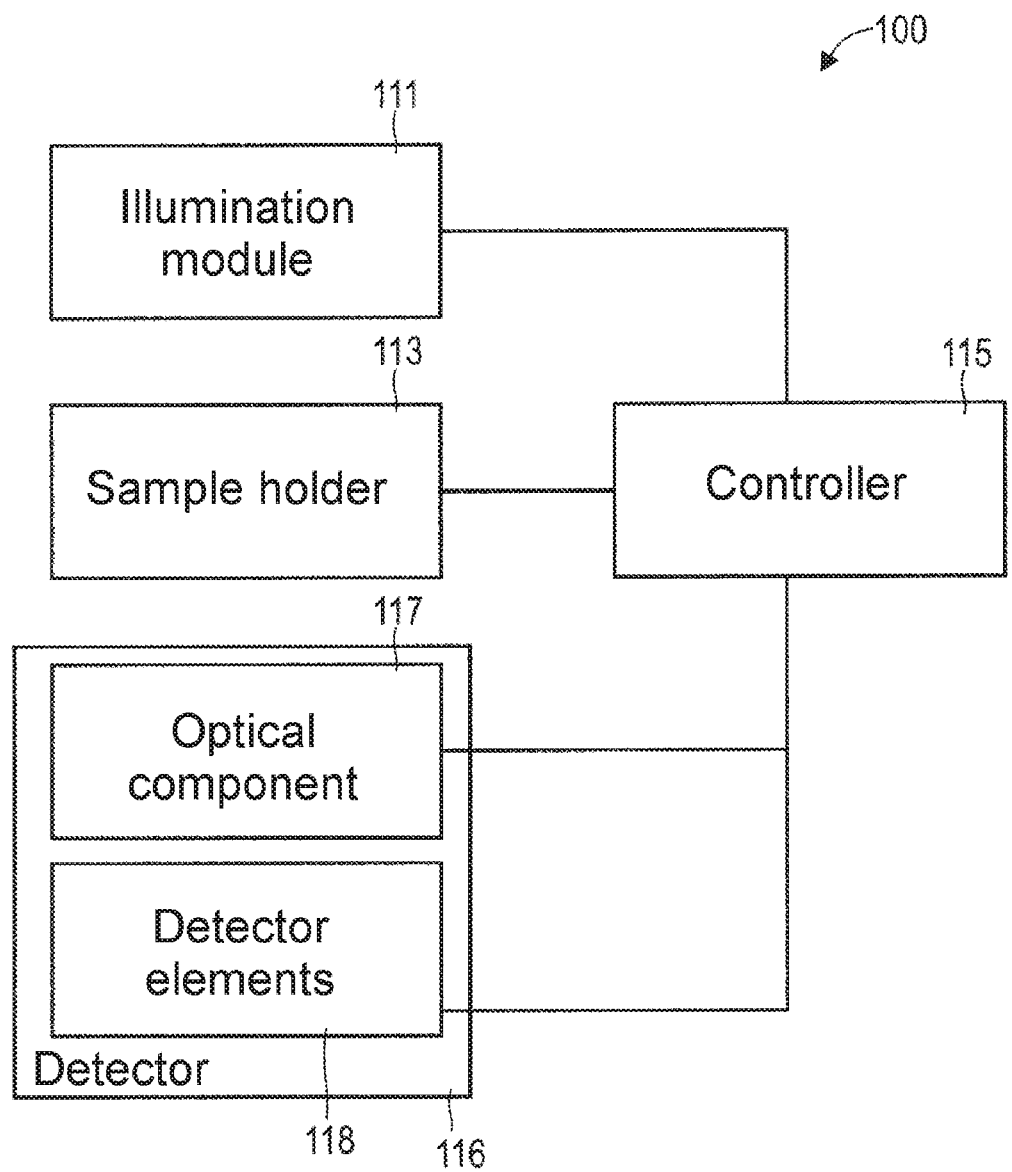
FIG. 1 schematically illustrates an optical system that enables a reduction of interference in accordance with various examples.

FIG. 1 illustrates an exemplary optical apparatus 100. By way of example, the optical apparatus 100 in accordance with the example in FIG. 1 could implement a light microscope, for example using transmitted-light geometry or using reflection geometry. It would also be possible for the optical apparatus 100 to implement a laser scanning microscope or a fluorescence microscope. The optical apparatus 100 can enable the magnified representation of small structures of a sample object fixed by a sample holder 113.

A detector 116 is configured to generate an image of the sample object on detector elements 118, e.g. by means of a lens 117 or some other optical component. The detector 116 can thus form a camera, for example. The detector elements 118 can then be configured to capture one or more images of the sample object, in each case having a plurality of pixels. The different pixels can correspond to different detector elements 118. By way of example, a CCD or CMOS sensor can be used.

An illumination module 111 is configured to illuminate the sample object fixed on the sample holder 113. The illumination module 111 can be configured, in particular, to enable an angle-variable illumination of the sample object. This means that the illumination module 111 can be configured optionally to illuminate the sample object from different illumination directions or generally to implement different illumination geometries: different illuminations can thus be implemented as a result. To that end, the illumination module 111 could have a multiplicity of light sources, for example, which can be drivable separately—i.e. can be switched on and off separately from one another. Other implementations of the illumination module 111 could also be chosen, for example a micro mirror device (digital micromirror device, DMD) or a scanner.

A controller 115 is provided to drive the various components 111-114 of the optical apparatus 100. By way of example, the controller 115 could be implemented as a microprocessor or microcontroller. As an alternative or in addition thereto, the controller 115 could comprise an FPGA or ASIC, for example. The controller 115 could for example load program code from a memory (not illustrated in FIG. 1).

By way of example, the controller 115 could be configured to drive a motor of the sample holder 113 to alter the arrangement of the sample object relative to the detector 116 and/or to alter the arrangement of the sample object relative to the illumination module 111—and thus the illumination. It would also be possible for the controller 115 to be configured to drive a motor of the sample holder 113: by this means, too, it is possible to alter the arrangement of the sample object relative to the detector 116. The controller can furthermore be configured to drive the illumination module 111 for altering the illumination, e.g. by choosing different illumination geometries: by this means, too, it is possible to alter the arrangement of the sample object relative to the illumination.

The optical system 100 is thus configured to set flexibly a relative arrangement between sample object, firstly, and illumination by the illumination module 111 and/or the detector 116. In this case, in principle, it is possible to use different techniques alone or in combination in order to vary said arrangement.

A first technique comprises using different illuminations. To that end, the controller can drive the illumination module 111 in a suitable manner. To that end, by way of example, the illumination module 111 could be adjusted mechanically in order thereby to implement different illumination directions. By way of example, a lateral displacement perpendicularly to the beam path could be implemented. In such a scenario, different positions of the illumination module 111 correspond to different relative arrangements of the sample object with respect to the illumination. In another variant, however, the illumination module 111 could also have a plurality of light sources, such that different illumination geometries can be implemented by driving different light sources. The illumination can be varied by this means, too. Different relative arrangements of the sample object with respect to the illumination can be implemented by the use of different illuminations.

A second technique comprises using an adjustable sample holder 113. By way of example, it would be possible for a motor to be provided, which adjusts the sample holder 113—and thus the sample object fixed by the sample holder 113—relative to the illumination by the illumination module 111 and/or relative to the detector 116. By way of example, a lateral displacement perpendicularly to the beam path could be implemented. Different positions of the sample holder 113 then correspond to different relative arrangements between firstly the sample object and secondly illumination by the illumination module 111 and the detector 116.

A third technique, finally, comprises using an adjustable detector 116. By way of example, the optical component 117 could be adjustable and/or the detector elements 118 could be adjustable. By way of example, a lateral displacement perpendicularly to the beam path could be implemented. By way of example, it would be possible for a motor to be provided, which adjusts the detector 116—relative to the sample holder 113 and the illumination module 111. Different positions of the detector 116 then correspond to different relative arrangements between firstly the sample object and secondly the detector 116.

Figure 2:
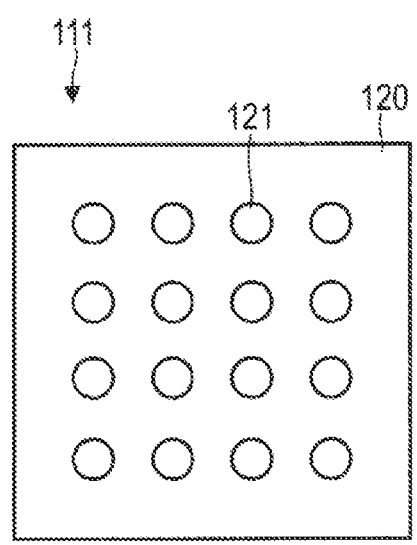
FIG. 2 schematically illustrates an illumination module in accordance with various examples having a multiplicity of light sources, wherein, by driving the different light sources, it is possible to vary the illumination of the sample object by using different illumination geometries.

FIG. 2 illustrates aspects in relation to the illumination module 111. In the exemplary implementation in accordance with FIG. 2, the illumination module 111 comprises a carrier 120, on which a multiplicity of light sources 121—for example light emitting diodes—are arranged. In the example in FIG. 2, the light sources 121 are arranged in a lattice structure. In other examples, however, the light sources 121 could also be arranged on the carrier 120 in a different way, for example in a ring-shaped manner, etc. By way of example, the light sources 121 could be arranged around a lens in a ring-shaped manner, i.e. a so-called LED ring light can be used.

The controller 115 can be configured to drive individual light sources 121 separately, i.e. to switch individual light sources 121 on and off separately. By virtue of one specific light source 121 being switched on and the remaining light sources 121 being switched off, it is possible to implement the illumination of the sample object with a specific illumination direction. However, it would also be possible for a specific illumination direction to be implemented by switching on more than one light source 121. By way of example, two or more adjacent light sources 121 could be switched on. In this way, in general, the illumination geometry of the illumination of the sample object can be varied. In particular, it is thus possible to vary the relative arrangement of the sample object relative to the illumination.

The illumination module 111 could have further optical elements, for example a condenser lens element, etc. This is not illustrated in FIG. 2 for reasons of simplicity.

Figure 3:
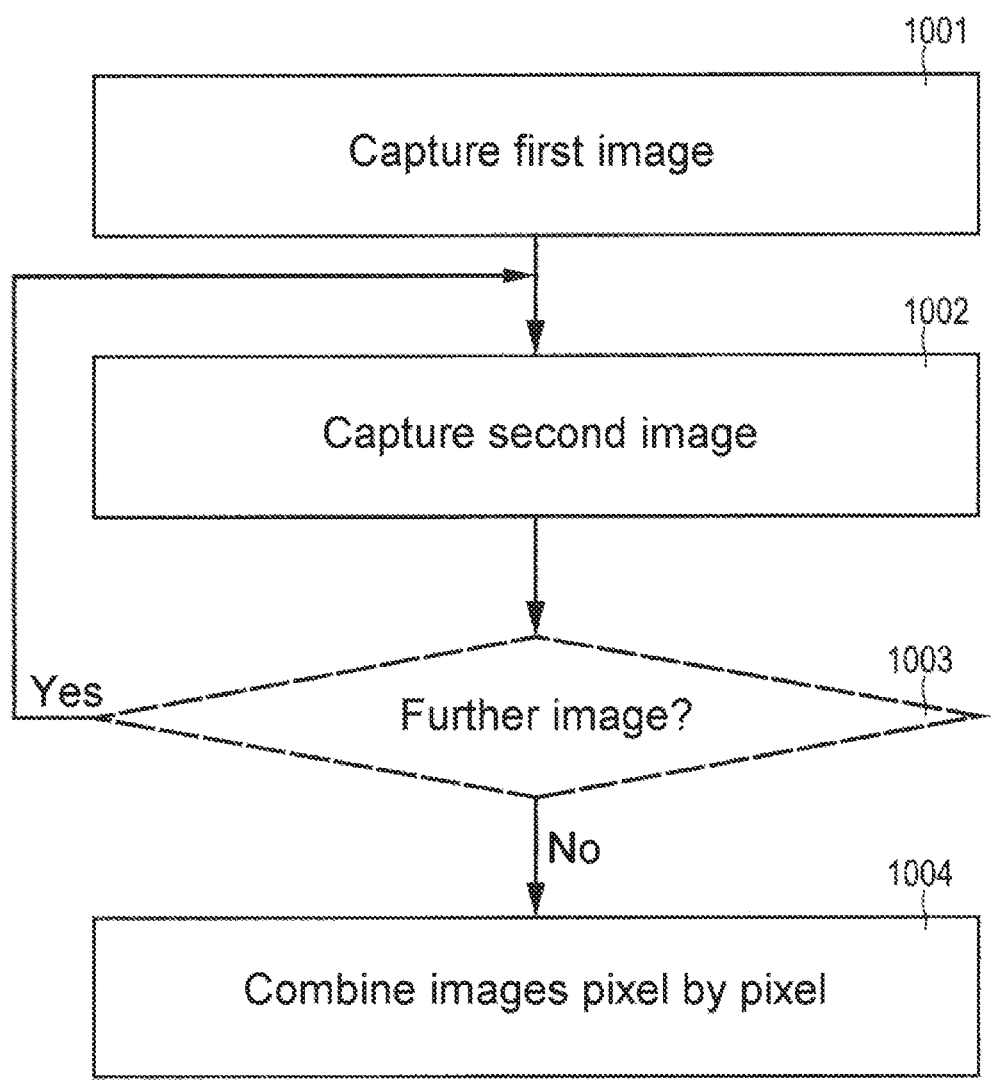
FIG. 3 is a flowchart of one exemplary method.

FIG. 3 is a flowchart of one exemplary method. By way of example, the controller 115 could be configured to carry out the method in accordance with the example in FIG. 3. By way of example, to that end, the controller 115 could load program code from a memory and then execute it.

Firstly, capturing a first image of the sample object is carried out in block 1001. To that end, for example, the detector elements 118 could be driven. The image can have a plurality of pixels corresponding respectively to a measurement signal of the various detector elements 118. In block 1001, the first image is captured for a first arrangement of the sample object with respect to the illumination and with respect to the detector.

This can comprise choosing the first arrangement in a targeted manner, for example by means of one or more of the following techniques: (I) predefining the illumination in a targeted manner, for example by predefining a specific illumination geometry for instance by means of the use of one or more light sources from a multiplicity of light sources, cf. FIG. 2; (II) predefining the position of the sample object in a targeted manner, for example by driving a motor of a sample holder, such that the latter assumes a specific position; and/or (III) predefining the position of the detector in a targeted manner, for example by driving a motor that adjusts the detector elements and/or some other optical component of the detector.

Figure 4:
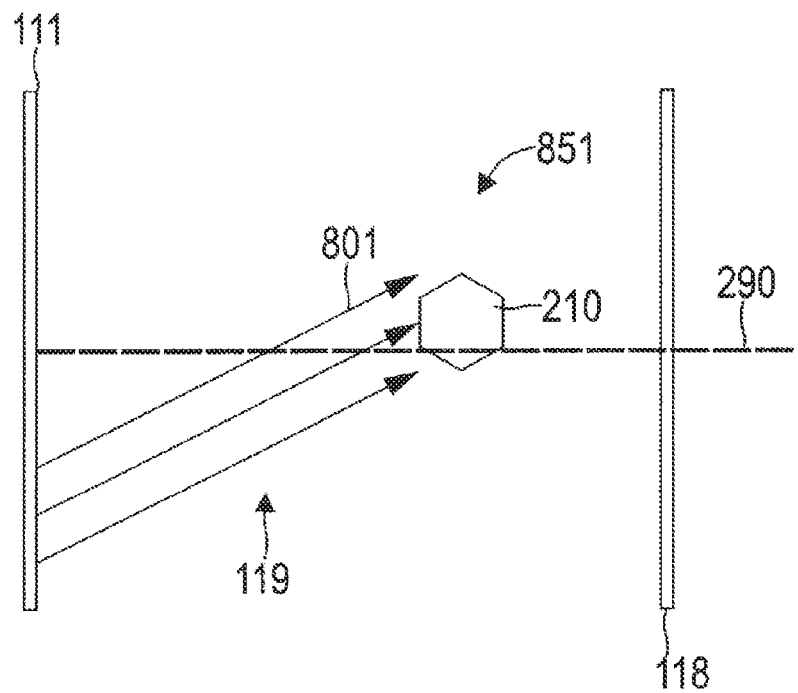
FIG. 4 illustrates an exemplary first relative arrangement of the sample object with respect to the illumination and with respect to the detector, wherein the first relative arrangement is characterized by a first illumination geometry of the illumination.
Figure 5:
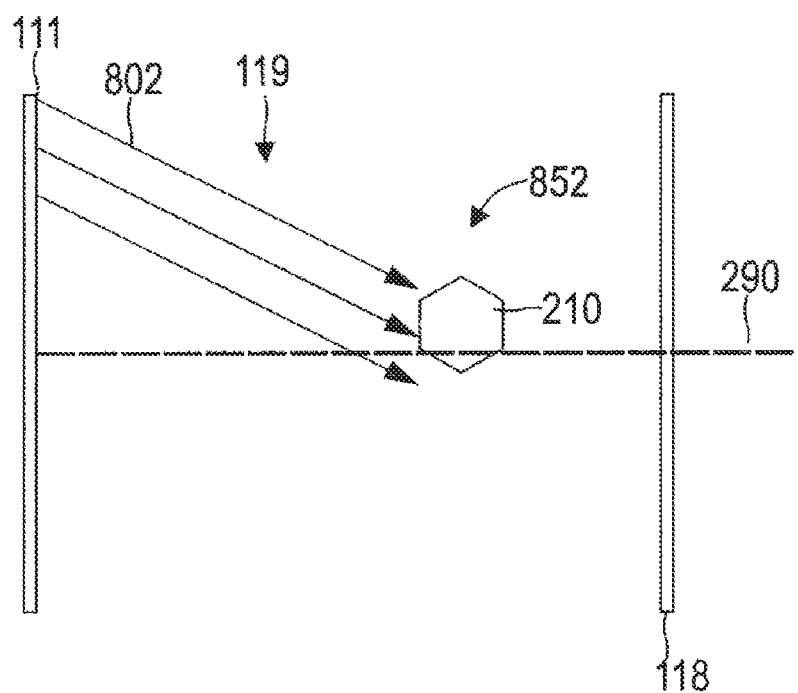
FIG. 5 illustrates an exemplary second relative arrangement of the sample object with respect to the illumination and with respect to the detector, wherein the second relative arrangement is characterized by a second illumination geometry of the illumination.
Figure 6:
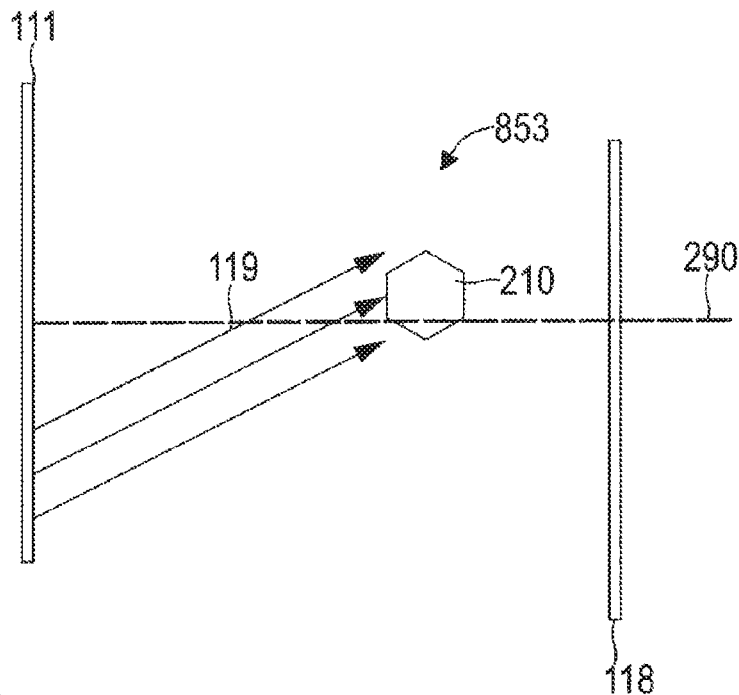
FIG. 6 illustrates an exemplary third relative arrangement of the sample object with respect to the illumination and with respect to the detector, wherein the third relative arrangement is characterized by a displaced position of the detector elements of the detector.
Figure 7:
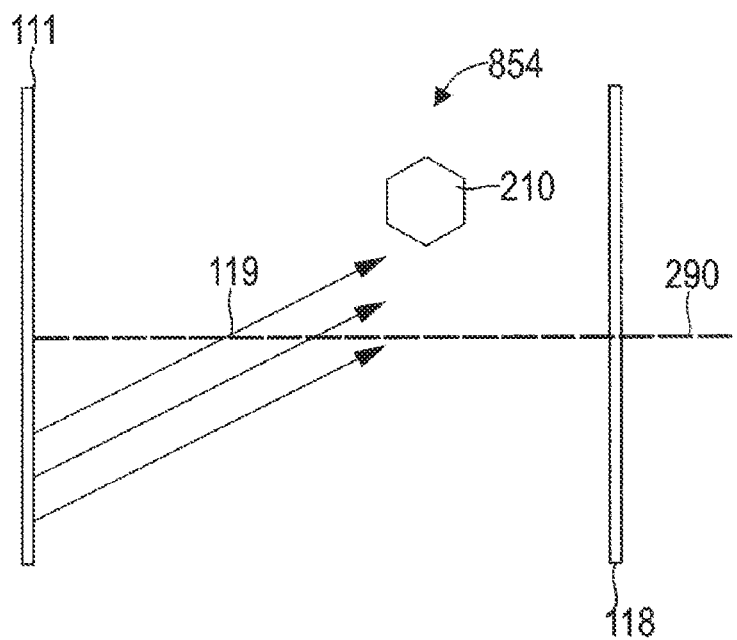
FIG. 7 illustrates an exemplary fourth relative arrangement of the sample object with respect to the illumination and with respect to the detector, wherein the fourth relative arrangement is characterized by a displaced position of the sample object.

The targeted predefinition of the illumination 119 by using different illumination geometries is illustrated e.g. in FIGS. 4 and 5, wherein the different illumination geometries 801, 802 (implemented by different illumination directions in the example in FIGS. 4 and 5) could be produced e.g. by driving different light sources 121 in a scenario in accordance with FIG. 2. The targeted predefinition of the position of the detector elements 118 is illustrated e.g. in FIG. 6. This corresponds to positioning the detector 116. Finally, the targeted predefinition of the position of the sample object 210 is illustrated in FIG. 7. By way of example, in FIG. 6, the detector elements 118 are displaced relative to the scenario in FIG. 7; correspondingly, in FIG. 7, the sample object 210 is displaced relative to the scenario in FIG. 6. In FIGS. 4-7, the optical axis 290 is illustrated as a reference in order to enable a comparison of the FIGs. It is evident from a comparison of FIGS. 4-7 that the arrangement 851-854 of the sample object 210 with respect to the illumination 119 and with respect to the detector 116 can be varied partly or fully circumferentially in this way.

Referring once again to FIG. 3: a second image of the sample object is then captured in block 1002. To that end, the detector elements 118 could once again be driven, for example. The second image from block 1002 can also have a plurality of pixels. The second image is captured in block 1002 for a second arrangement of the sample object with respect to the illumination and/or with respect to the detector elements, said second arrangement being at least partly different than the first arrangement in block 1001. This can in turn be done by predefining the second arrangement in a targeted manner, wherein one or more of the techniques which were described above in relation to block 1001 can also be used (cf. also FIGS. 4-7).

This means that by carrying out blocks 1001 and 1002, therefore, a first image of the sample object is obtained for a first arrangement of the sample object with respect to the illumination and/or with respect to the detector, and a second image of the sample object is obtained for a second arrangement of the sample object with respect to the illumination and/or with respect to the detector, said second arrangement being at least partly different than the first arrangement.

Figure 8:
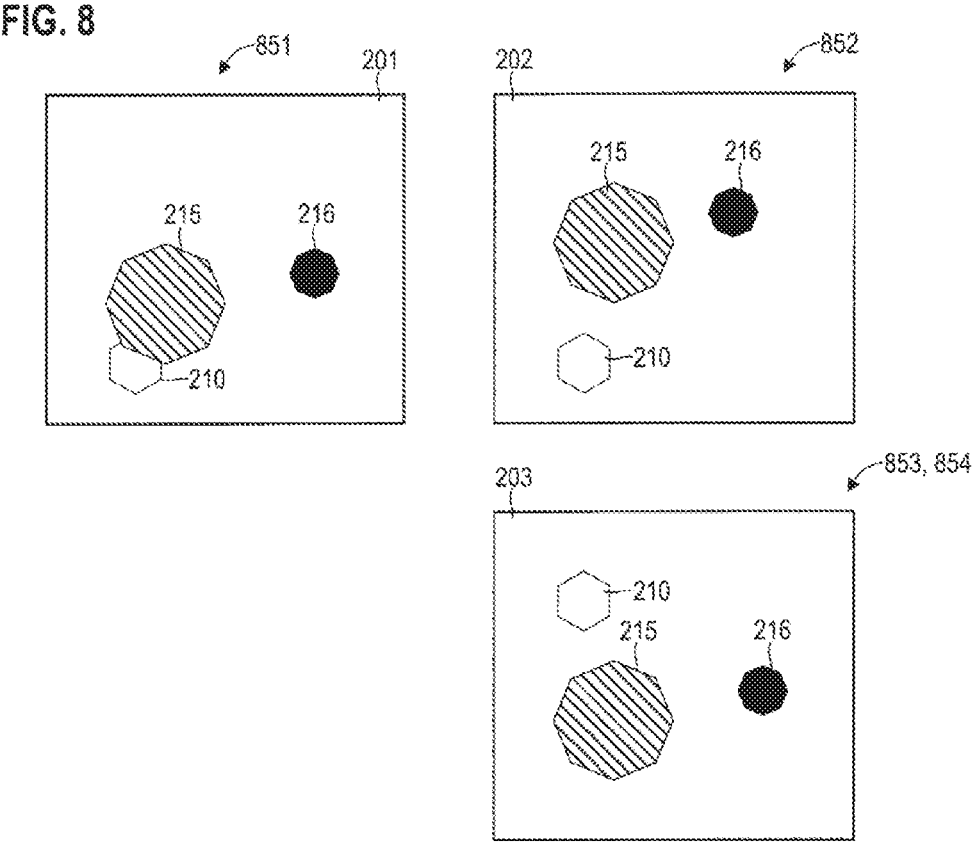
FIG. 8 illustrates exemplary images which each image the sample object, wherein the different images were captured in accordance with various examples for different relative arrangements between firstly the sample object and secondly the illumination and the detector.
Figure 9:
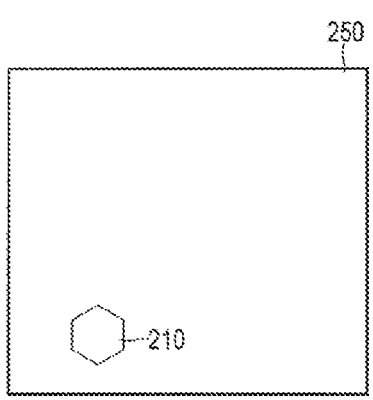
FIG. 9 illustrates an exemplary result image that was obtained by combination of the images from FIG. 8 and has reduced image artifacts in accordance with various examples.

As a result, it is possible to achieve an effect illustrated in association with FIGS. 8 and 9.

FIG. 8 illustrates an image 201 that was captured for an arrangement 851 between the sample object 210 and the illumination 119 and also the detector 116. The image 201 includes a reflection 215. The reflection 215 partly overlaps the image of the sample object 210, for which reason a loss of information is present. In addition, the image 201 also includes a shading 216.

In general, the processed images could have more than one reflection 215 and/or have more than one instance of shading 216. It would also be possible for the processed images either to have only one or more reflections or else to have only one or more instances of shading. The techniques described herein can be applied flexibly to all such scenarios in order to bring about a reduction of interference.

FIG. 8 also illustrates an image 202 that was captured for the arrangement 852 between the sample object 115 and the illumination 119 and also the detector 116. In comparison with the image 201, in this case, therefore, the illumination geometry 801, 802 and hence the illumination 119 were varied, but the position of the detector 116 and the position of the sample holder 113 and thus of the sample object 215 were not altered (cf. FIGS. 4 and 5). Therefore, the position of the image of the sample object 215 does not change between the images 201 and 202; however, the position of the reflection 215 and of the shading 216 does change. This effect can be utilized to implement the reduction of interference.

FIG. 8 finally also illustrates an image 203, captured for the arrangement 853 or the arrangement 854 between the sample object 115 and the illumination 119 and also the detector 116. In comparison with the image 201, the illumination geometry 801, 802 was not varied in this case, and so the same illumination 119 is used. However, the position of the detector 116 relative to the position of the sample holder 113 was altered—by adjusting the detector 116, i.e. in particular the detector elements 118, and/or the sample holder 113, cf. FIGS. 6 and 7. Therefore, the position of the image of the sample object 210 changes; the position of the reflection 215 and the position of the shading 116 remain unchanged, however. This effect can also be utilized to implement the reduction of interference.

Referring once again to FIG. 3: block 1003 is then carried out. Block 1003 is optional. Block 1003 involves checking whether a further second image is intended to be captured for a further arrangement of the sample object with respect to the illumination and/or with respect to the detector. If this is the case, block 1002 is carried out again, wherein the arrangement of the sample object with respect to the illumination and with respect to the detector can be varied again. Otherwise, block 1004 is carried out.

In general, in the various techniques described herein, a different number of images can be taken into account when determining the result image. A larger number of images may tend to enable a better reduction of interference. On the other hand, however, capturing a larger number of images can also take up a longer time duration and require more computer resources of the controller. Therefore, in the various techniques described herein, it may be worthwhile to take account of a weighing up between quality of the reduction of interference, on the one hand, and speed until provision of the result image, on the other hand, in connection with block 1003. By way of example, a fixedly predefined threshold value for the number of iterations of block 1002 could be taken into account in block 1003. It has been found, for example, that a number of 3-8 images taken as a basis for determining the result image enables a high quality of the reduction of interference, on the one hand, and does not significantly decrease the speed until provision of the result image, on the other hand.

In other examples, a quality measure could also be checked online in block 1003: to that end, the combination of the various images for generating the result image could at least partly be carried out beforehand in order to ascertain the quality measure. If the quality measure indicates a sufficiently high quality of the result image in connection with the reduction of interference, carrying out further iterations of block 1002 can be terminated.

In yet other examples, the adaptation of the arrangement for different iterations of block 1002 could be carried out by means of an optimization. By way of example, a genetic algorithm, a simplex method, a gradient method or a trust region method could be used. As a result, the comparatively large parameter space of the available arrangements 851-854 can be traversed efficiently in order to achieve a particularly good reduction of interference with a minimum number of iterations of block 1002. The abovementioned quality measure and/or a threshold value for the number of iterations could serve as a termination criterion. In this case, such a flexible variation of the arrangement 851-854 for the various images taken into account is not necessary in all examples, however: e.g. in general it would also be possible for a fixedly predefined number of arrangements 851-853 to be processed successively. Combining the first image from block 1001 and the one or more second images from one or more iterations of block 1002 pixel by pixel is carried out in block 1004. A result image having the image artifacts reduced is obtained as a result. The result image can thus have a particularly high image quality.

Combining pixel by pixel can mean that the pixel values of the various images are combined differently, depending on the pixel. By way of example, in the result image for a first pixel the pixel value of the first image could be taken into account, but not the assigned pixel value of the second image; by contrast, in the result image for a second pixel the pixel value of the first image could not be taken into account, but the pixel value of the assigned pixel of the second image could be taken into account. A pixel-dependent weighting of the pixel values of the various images would also be conceivable. In general, different pixels are thus treated differently during the process of combining pixel by pixel.

The process of combining pixel by pixel can make it possible for that or those pixel value(s) not corrupted by image artifacts 215, 216 to be taken into account in each case. A result image 250 having no or no significant reflections 215 and/or instances of shading 216 is obtained as a result; see FIG. 9. FIG. 9 illustrates the result image 250 obtained from the combination of the images 201-203 pixel by pixel. Said result image shows the sample object 210, but not the image artifacts 215, 216. A corresponding technique is illustrated in association with FIG. 10.

Figure 10:
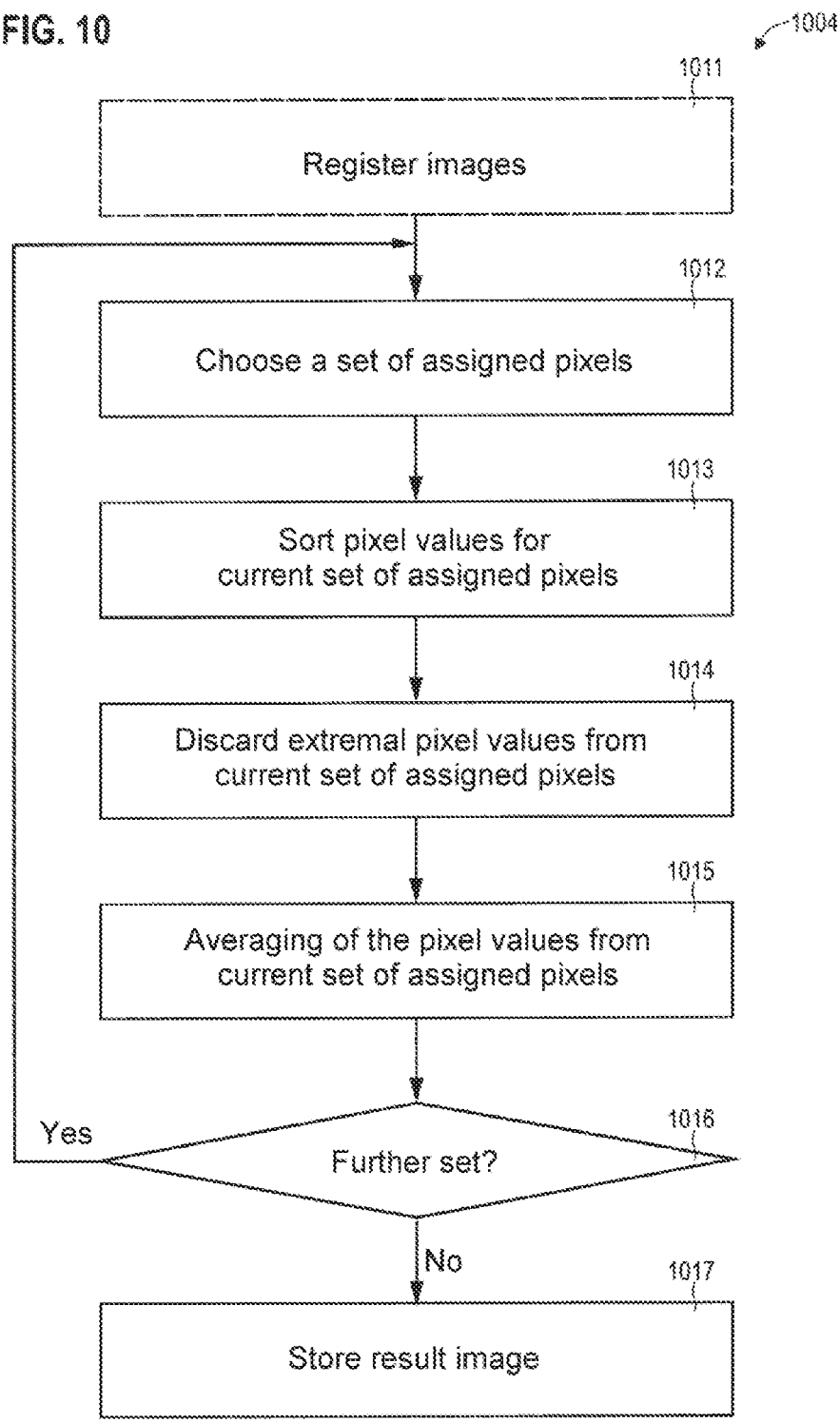
FIG. 10 is a flowchart of one exemplary method.

FIG. 10 is a flowchart of one exemplary method. For example, the method in accordance with FIG. 10 could be carried out in association with block 1004 of the method in FIG. 3. The method in accordance with FIG. 10 makes it possible to combine pixel by pixel a plurality of images having at least partly different arrangements of the sample object with respect to the illumination and with respect to the detector.

Firstly, registration of the different images is carried out in block 1011. In principle, block 1011 is optional. The registration of the different images makes it possible to obtain an assignment between pixels of the different images. What can be achieved in this way is that pixels which include the same information content in different images are assigned to one another. Pixels which image the same region of the sample object 210 can thus be assigned to one another. In particular, such an assignment can be ensured even if the image of the sample object is contained at different positions in the different images (cf. FIG. 8, images 201 and 203). Conventional registration techniques can be used. In the various examples described herein, the registration can comprise a translation and/or a compression and/or a rotation and/or a distortion.

An assignment between the pixels of the different images is obtained by means of the registration in block 1011. If block 1011 is not carried out, a simple one-to-one assignment of the pixels of the different images can be used, i.e. pixels obtained by the same detector element can be assigned to one another.

A set of assigned pixels is then selected in block 1012. The set selected in block 1012 includes as many elements as there are images (hereinafter n elements). This corresponds to the number of iterations of block 1002, cf. FIG. 3.

Figure 11:
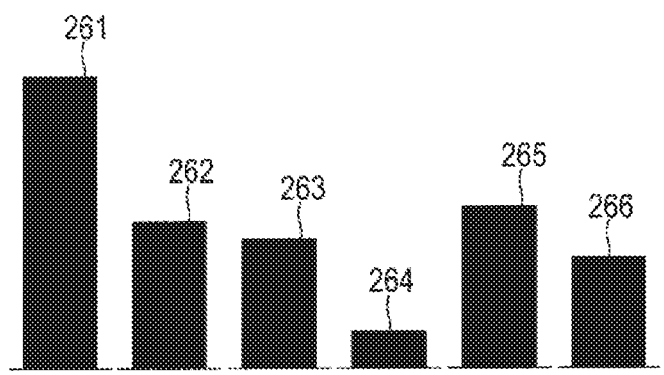
FIG. 11 illustrates pixel values for pixels of various images that are assigned to one another in accordance with various examples.

By way of example, FIG. 11 illustrates, for a scenario where n=6, the pixel values 261-266 for a set of assigned pixels from images with various arrangements 851-854. It is evident from the example in FIG. 11 that—although the assigned pixels of a set should have the same information content—the pixel values vary significantly. This variation of the pixel values 261-266 can occur on account of the image artifacts.

In general, in the various examples described herein, different information can be coded by the pixel values. By way of example, a brightness and/or a color could be coded by the pixel values. If a brightness, for example, is coded by the pixel values, then the pixel value 261 could indicate a particularly high brightness; this can be an indication that the pixel value 261 is caused on account of a reflection 215. Correspondingly, the pixel value 264 indicates a particularly low brightness; this can be an indication that the pixel value 264 is caused on account of a shading 216. These findings can be used to implement the reduction of interference.

To that end, it may be possible, in general, to compare the various pixel values 261-266 of assigned pixels with one another. This comparison can be taken into account when combining the images. By way of example, particularly large or particularly small, i.e. in general non-extremal, pixel values can be identified in this way. In the various examples described herein, it is generally possible to use one or more non-extremal pixel values when combining the images for the respective pixel, while one or more extremal pixel values can be discarded before the combining.

One possibility for implementing the comparison comprises the analysis of the distribution of the pixel values 261-266 of assigned pixels of the various images. By way of example, the slopes of the distribution could be truncated. This can be achieved e.g. in a simple manner by means of sorting the pixel values 261-266. By way of example, FIG. 12 illustrates the sorted distribution 279 of the pixel values 261-266 from FIG. 11.

Referring once again to FIG. 10: in order to implement the reduction of interference, it is thus possible to carry out a process of sorting the pixel values for the current set of assigned pixels. The sorting can be carried out for example from large pixel values toward small pixel values.

Then, in block 1014, it is possible to discard the extremal pixel values from the current set of assigned pixel values. In the scenario in FIG. 12, this means that only the pixel values within the central region 271 are retained, but the extremal pixel values 261 and 264 are discarded. This corresponds to truncating the slopes of the distribution 279. For example, in general, the o largest and/or the p smallest pixel values could be discarded (wherein n−o+p>0 in order that at least one pixel value remains). What can be achieved as a result is that such pixel values 261, 264 which are highly likely to be corrupted by image artifacts 215, 216 do not exert any influence on the result image 250. This makes it possible to suppress the interference structure.

Figure 12:
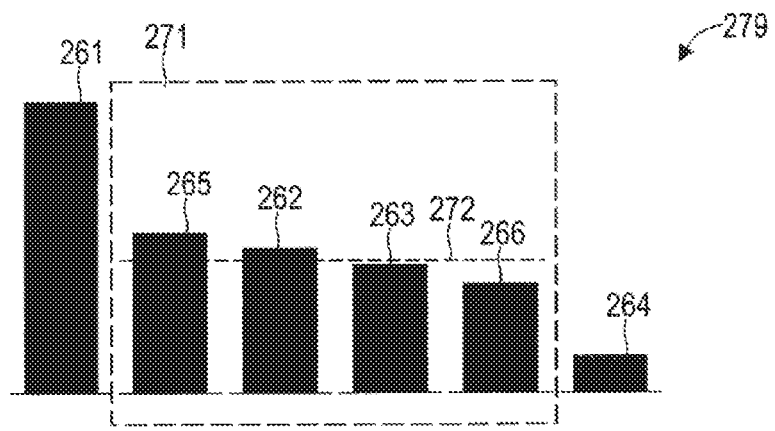
FIG. 12 illustrates a sorted distribution of the pixel values from FIG. 11 with truncated slopes.

In block 1015 in FIG. 10, finally, the averaging of the pixel values that have not been discarded is carried out, i.e. in the scenario in FIG. 12 the average value 272 of the pixel values 262, 263, 265, 266 in the central region 271 of the sorted distribution is determined. The discarded, extremal pixel values 261, 264 are ignored when determining the average value.

Such techniques illustrated in association with FIGS. 10-12 can be varied in other examples. By way of example, a median over all the various pixel values of assigned pixels of the different images could also be determined, as a result of which extremal pixel values 261, 164 would be represented in the result image to a lesser extent than non-extremal pixel values. A weighted averaging would also be possible. In all such examples, the comparison of the pixel values 261-266 makes it possible to identify extremal pixel values. This makes it possible particularly robustly to identify those images in which a specific imaged region is corrupted by an image artifact 215, 216.

In summary, a description has been given above of techniques which enable a reduction of interference by means of digital postprocessing of a plurality of captured images. By way of example, the digital postprocessing can be configured to carry out an "on-the-fly" reduction of interference. That is to say that a latency between image capture and display with reduction of interference can be for example less than 1 second or optionally less than 500 ms. Such short latencies can be achieved, in particular, if use is made of different illuminations by use of an array of light emitting diodes for the variation of the arrangement. In order to implement the reduction of interference, in this case the relative arrangement between firstly sample object and secondly illumination and detector can be varied at least partly from image to image. What is achieved as a result is that in the different images different regions are influenced by the image artifacts. What can then be achieved by combining the different images pixel by pixel is that a result image is obtained which has no or only a reduced number of image artifacts.

Techniques described herein make it possible, in particular, to implement the reduction of interference particularly flexibly. In particular, it is possible to eliminate a limitation for example with regard to the choice of the different illuminations in comparison with reference implementations: for example, it is also possible to use adjacent illumination directions for implementing different illuminations, without this necessarily resulting in a poorer reduction of interference. By way of example, it is also possible to remove image artifacts which still overlap when adjacent illumination directions are used. By way of example, it is also possible to use different brightnesses for the different illuminations: by suitably combining the various images, for example by averaging and/or comparing the pixel values of assigned pixels, it is possible to take account of variations of the brightness of the illumination.

The techniques described herein can be used in various fields of application. One example concerns, for instance, the reduction of interference in microscopy with an LED ring light having separately drivable LEDs. A further example concerns e.g. medical equipment for examining eyes: for instance, a slit lamp with an additional lens in front of the eye and changing illumination directions could be used in this case. A further example concerns e.g. application in materials testing or production testing, e.g. in association with printed circuit boards, etc.

While exemplary embodiments have been described with reference to the figures, modifications can be realized in further exemplary embodiments.

While the image recording apparatus according to exemplary embodiments can, in particular, be a microscope system, the techniques described can also be used in other imaging systems.

What is claimed is:

1. A method for reduction of artifacts in images, comprising:
    by means of an illumination of an illumination module and by means of a plurality of detector elements of a detector: capturing a first image of a sample object, for a first arrangement of the sample object with respect to the illumination and with respect to the detector, and also capturing at least one second image of the sample object, for a second arrangement of the sample object with respect to the illumination and with respect to the detector, wherein the second arrangement is at least partly different than the first arrangement,
    for each pixel of the first image: comparing the respective pixel value with at least one pixel value of at least one assigned pixel of the at least one second image, and
    depending on said comparing: combining the first image and the at least one second image pixel by pixel in order to generate a result image, wherein
    the first arrangement of the sample object with respect to the illumination and with respect to the detector is associated with a first illumination direction, and the second arrangement of the sample object with respect to the illumination and with respect to the detector is associated with a second illumination direction, the first illumination direction being different from the second illumination direction.

2. The method as claimed in claim 1, furthermore comprising:
    controlling the illumination module in order to generate the illumination with a first illumination geometry which is associated with the first arrangement, and
    controlling the illumination module in order to generate the illumination with at least one second illumination geometry which is associated with the at least one second arrangement and which is different than the first illumination geometry.

3. The method as claimed in claim 1, furthermore comprising:
    controlling a sample holder which fixes the sample object in order to fix the sample object in a first position which is associated with the first arrangement, and
    controlling the sample holder in order to fix the sample object in a second position which is associated with the second arrangement and which is different than the first position.

4. The method as claimed in claim 1, furthermore comprising:
    controlling a motor, which fixes the detector, in order to fix the detector in a first position which is associated with the first arrangement, and
    controlling the motor in order to fix the detector in a second position which is associated with the second arrangement and which is different than the first position.

5. The method as claimed in claim 1, furthermore comprising:
    for each pixel of the first image: using the respective pixel for the combining if said comparing indicates a non-extremal pixel value.

6. The method as claimed in claim 1, furthermore comprising:
for each pixel of the first image: determining a distribution of pixel values of the respective pixel of the first image and of at least one assigned pixel of the at least one second image, and
truncating at least one slope of the distribution by discarding corresponding pixels when combining the first image with the at least second image.

7. The method as claimed in claim 1,
wherein said combining for each pixel of the result image comprises an averaging of non-extremal pixel values of assigned pixels of the first image and of the at least one second image.

8. The method as claimed in claim 1, furthermore comprising:
registering the first image with the at least one second image in order to obtain an assignment between pixels of the first image and pixels of the at least one second image,
wherein said combining pixel by pixel is carried out depending on the assignment between the pixels of the first image and the pixels of the at least one second image.

9. A non-transitory computer readable medium comprising computer executable instructions adapted to perform the method in accordance with claim 1.

10. A controller for an optical system having an illumination module and a detector having a plurality of detector elements,
wherein the controller is configured to control the optical system to capture a first image of a sample object for a first arrangement of the sample object with respect to the illumination by the illumination module and with respect to the detector and to capture at least one second image of the sample object for a second arrangement of the sample object with respect to the illumination by the illumination module and with respect to the detector, wherein the second arrangement is at least partly different than the first arrangement,
wherein the controller is furthermore configured to compare, for each pixel of the first image, the respective pixel value with at least one pixel value of at least one assigned pixel of the at least one second image,
wherein the controller is furthermore configured to combine the first image and the at least one second image pixel by pixel in order to generate a result image and depending on said comparing, and wherein
the first arrangement of the sample object with respect to the illumination and with respect to the detector is associated with a first illumination direction, and the second arrangement of the sample object with respect to the illumination and with respect to the detector is associated with a second illumination direction, the first illumination direction being different from the second illumination direction.

11. The controller as claimed in claim 10,
wherein the controller is configured to:
control the illumination module in order to generate the illumination with a first illumination geometry which is associated with the first arrangement, and
control the illumination module in order to generate the illumination with at least one second illumination geometry which is associated with the at least one second arrangement and which is different than the first illumination geometry.

12. The controller as claimed in claim 10, wherein the controller is configured to:
control a sample holder which fixes the sample object in order to fix the sample object in a first position which is associated with the first arrangement, and
control the sample holder in order to fix the sample object in a second position which is associated with the second arrangement and which is different than the first position.

13. The controller as claimed in claim 10, wherein the controller is configured to: control a motor, which fixes the detector, in order to fix the detector in a first position which is associated with the first arrangement, and
control the motor in order to fix the detector in a second position which is associated with the second arrangement and which is different than the first position.

14. The controller as claimed in claim 10, wherein the controller is configured to:
for each pixel of the first image: use the respective pixel for the combining if said comparing indicates a non-extremal pixel value.

15. The controller as claimed in claim 10, wherein the controller is configured to:
for each pixel of the first image: determine a distribution of pixel values of the respective pixel of the first image and of at least one assigned pixel of the at least one second image, and
truncate at least one slope of the distribution by discarding corresponding pixels when combining the first image with the at least second image.

16. The controller as claimed in claim 10, wherein the controller, in combining for each pixel of the result image, is configured to average non-extremal pixel values of assigned pixels of the first image and of the at least one second image.

17. The controller as claimed in claim 10, wherein the controller is configured to: register the first image with the at least one second image in order to obtain an assignment between pixels of the first image and pixels of the at least one second image,
wherein said combining pixel by pixel is carried out based on the assignment between the pixels of the first image and the pixels of the at least one second image.

* * * * *